United States Patent [19]
Baldwin et al.

[11] 3,816,773
[45] June 11, 1974

[54] METHOD AND APPARATUS FOR DETECTING PARTICULATE MATERIAL IN FLOW STREAM

[75] Inventors: Willett F. Baldwin, Dallas; Lynn D. Mullins, De Soto, both of Tex.

[73] Assignee: Mobil Oil Corporation, New York City, N.Y.

[22] Filed: Oct. 12, 1972

[21] Appl. No.: 297,097

[52] U.S. Cl............ 310/8.1, 73/61 R, 73/194 A, 73/194 B, 310/8.3, 310/8.7, 310/9.1, 310/8.2
[51] Int. Cl........................................... H01v 7/00
[58] Field of Search ............... 310/8.1, 8.3, 8.9, 9.1, 310/9.4, 8.2, 8.7; 340/8 LF, 236; 73/194 R, 194 A, 194 B, 194 E, 40.5 A, 61 R, 67.6, 67.7, 67.8, 67.9

[56] References Cited
UNITED STATES PATENTS

| | | | |
|---|---|---|---|
| 2,434,666 | 1/1948 | Mason | 340/8 LF |
| 2,444,911 | 7/1948 | Benioff | 340/8 LF |
| 2,746,480 | 5/1956 | Hildyard | 73/194 A X |
| 2,760,184 | 8/1956 | Beattie | 73/194 A X |
| 3,068,694 | 12/1962 | Worswick | 73/194 B |
| 3,402,386 | 9/1968 | Rodbell | 340/8 LF |
| 3,426,593 | 2/1969 | Jacobs | 73/194 B |
| 3,473,377 | 10/1969 | Reinecke | 73/194 C |
| 3,580,092 | 5/1971 | Scarpa | 73/194 B |
| 3,585,577 | 6/1971 | Rollwitz | 73/194 A X |
| 3,638,488 | 2/1972 | Meijer | 73/194 B |
| 3,719,073 | 3/1973 | Mahon | 73/194 B |

Primary Examiner—J. D. Miller
Assistant Examiner—Mark O. Budd
Attorney, Agent, or Firm—Andrew L. Gaboriault; Drude Faulconer

[57] ABSTRACT

A system for detecting the presence of particulate material, e.g., sand, in a fluid stream flowing through a conduit, said system comprising an acoustical probe which is positioned directly into the flow stream. The probe has a housing in which a transducer, e.g., piezolectric crystal, is suspended. The housing is filled with oil to acoustically couple the transducer to the housing. Particulate material in the flow stream gives up kinetic energy upon striking the housing of the probe which in turn excites the transducer to generate an output signal having a frequency component which is representative of the particulate material. The system includes circuitry which amplifies and filters the output signal to provide a processed signal corresponding to said frequency component and which includes means for utilizing said processed signal, e.g., an alarm activated when a certain sand content condition in the flow stream is exceeded.

24 Claims, 6 Drawing Figures

METHOD AND APPARATUS FOR DETECTING PARTICULATE MATERIAL IN FLOW STREAM

BACKGROUND OF THE INVENTION

This invention relates to a method and system for detecting the presence of a particulate material in a fluid stream flowing through a conduit and more particularly to a method and system utilizing a probe means which is positioned directly in a production flow stream for indicating the presence of particulate material, e.g., sand, which is being produced along with products from an oil and/or gas well.

Fluid minerals, such as oil and gas, are often discovered in subterranean imcompetent formations which are comprised of unconsolidated or loosely consolidated particulate material, e.g., sand. When these minerals are produced from said formations through a well to the surface, the loose or weakly bound sand particles are likely to become dislodged from the formation and become entrained in the produced fluids. These entrained particles not only can cause severe erosion of subsurface and surface production equipment, but they also tend to accumulate in field separators, flowlines, and storage tanks, thereby necessitating the stopping of production in order to clean and repair the affected equipment. Where substantial volumes of sand are produced, the mere disposal of the sand amounts to still another problem, all of which add considerably to the expense of producing the minerals. Therefore, fluid production from an incompetent formation can result in substantially increased production and maintenance costs unless the production of sand from the formation can be controlled.

Various processes are available for treating incompetent formations, e.g., consolidating treatments, to control the flow of sand. However, these are expensive and are not always successful. A simpler and less expensive technique is to control the flow rate of the produced minerals so that the volume of sand produced therewith is maintained at an acceptable level, see U.S. Pat. No. 3,563,311 issued Feb. 16, 1971. To be assured that the sand production is maintained at the desired level, the produced fluid flow stream should be closely monitored for particulate content.

Presently, the most commonly used known technique for monitoring sand production in a production flow stream is merely to periodically check the amount of sand accumulated in the field separators and compare it with the actual fluid production for a given time interval. Besides having to stop or reroute the production stream while the separators are checked, this technique still does not provide the continuous monitoring of the production stream necessary to warn an operator of unexpected increased sand production when it actually occurs. In other words, by only periodically checking the sand production, damage may have already occurred before an operator becomes aware that a problem exists. Therefore, a need exists for some means to continuously monitor the production stream from a well and instantaneously indicate the presence or increased presence of particulate material in said stream.

Several different types of devices have been used or proposed for detecting the presence of sand in the produced fluids from a well. One such device monitors the flow stream to determine wear caused by sand entrained therein and is commonly referred to as an erosion probe. One type of erosion probe is one which is inserted directly in the flow stream where the sand will gradually erode through the probe wall at which time the pressure of the flow stream will actuate an alarm or the like to warn the operator that a certain amount of erosion has occurred. However, these devices still involve a time delay between increased sand production and the sounding of an alarm and do not provide a continuous monitoring of the sand content in the flow stream.

Another type of erosion probe is one which is coated with radioactive material and is positioned into the flow stream. The particulate material will erode away the radioactive material which, in turn, changes the radiation reading from the probe. This type of probe is disclosed in U.S. Pat. No. 3,678,273 issued July 18, 1972.

Other devices of this general type are known wherein an acoustical device is lowered down into a well to determine if flow is occurring into the wellbore and/or to determine the location within the wellbore that such flow may be occurring, e.g., see U.S. Pats. Nos. 2,210,417 issued Aug. 6, 1940; 2,396,935 issued Mar. 19, 1946; 3,509,764 issued May 5, 1970; and 3,563,311 issued Feb. 16, 1971. These devices, however, require that production be curtailed while the devices are lowered and operated down the well and accordingly they are unable to continuously monitor the particulate content of the produced fluid stream during normal production operations.

Still other acoustical devices are available which monitor a flow stream through a conduit, these being flow meters which operate on acoustical principles. One such flow meter is disclosed in U.S. Pat. No. 3,580,092 issued to T. J. Scarpa on May 25, 1971. This flow meter utilizes a piezoelectric crystal pickup element which is clamped onto the outside of the pipe to "listen" for fluid flow through the pipe and is basically a flow/no-flow indicator which can be calibrated under certain conditions to monitor the amount of fluid flowing through the pipe.

SUMMARY OF THE INVENTION

The present invention provides a method and a system for continuously monitoring a flow stream through a conduit to detect and indicate the presence or increased presence of particulate material, e.g., sand, in said flow stream and to indicate when a predetermined particulate material condition has been exceeded in the flow stream.

More specifically, the present invention comprises a method and system which utilizes an acoustical probe means which is positioned directly into the conduit through which the flow stream to be monitored flows. The probe means, per se, is the subject of copending application Ser. No. 297,175, filed Oct. 12, 1972. The probe means is preferably comprised of a thin-walled, elongated, cylindrical housing having a fitting at one end for positioning the housing directly in said conduit with the elongated axis of the housing being perpendicular to the flow stream. The housing, which is preferably coated with a thin layer of wear-resistant material, is attached only at one end to the conduit with its other end being free. An acoustical transducer is suspended within said housing by means of its output lead and ground. The output lead extends from the housing to a point outside the conduit. A passage is provided in the housing for filling the housing with a noncompressible, nonconductive fluid, e.g., oil. The oil acoustically couples the transducer to the wall of the housing without allowing actual physical contact therebetween.

The acoustical transducer, e.g., piezoelectric crystal, has a primary resonant frequency in one of its modes in excess of 100 kilohertz, e.g., 700 kilohertz, thereby providing a proper response characteristic necessary for the detection of particulate material as will be explained below.

When the probe means is positioned in the conduit, the flow stream directly strikes the outer surface of the oil-filled housing giving up kinetic energy which in turn causes the acoustical transducer within the housing to oscillate to generate a signal having frequency components representative of said kinetic energy. The output signal of the probe means is then processed through circuitry which filters and amplifies the signal further to render it in some usable format.

More specifically, the circuitry of the present invention comprises a filter designed to pass a band of high frequencies, e.g., 650 to 750 kilohertz, centered about the tuned frequency of the transducer. This band of frequencies, which is indicative of the kinetic energy given up by the sand impinging on the housing, is passed through an amplifier and is then rectified to a form suitable for recording on a conventional DC recorder.

Also, the rectified signal is fed to alarm circuitry which includes different comparators, each of which compares said rectified signal with a particular reference voltage which is representative of some desired predetermined particulate material condition not to be exceeded. When the actual processed signal from the probe means exceeds a reference signal, the particular comparator will generate an error signal which in turn actuates an alarm to warn an operator that the predetermined condition has been exceeded. Further, as will be explained below, by use of an empirically derived relationship, the processed signal from the probe means provides a value representative of the concentration of sand present in the flow stream at a given time.

BRIEF DESCRIPTION OF THE DRAWINGS

The actual construction, operation, and the apparent advantages of the present invention wll be better understood by referring to the drawings in which like numerals identify like parts and in which.

DESCRIPTION OF THE PREFERRED EMBODIMENTS

Figure 1:
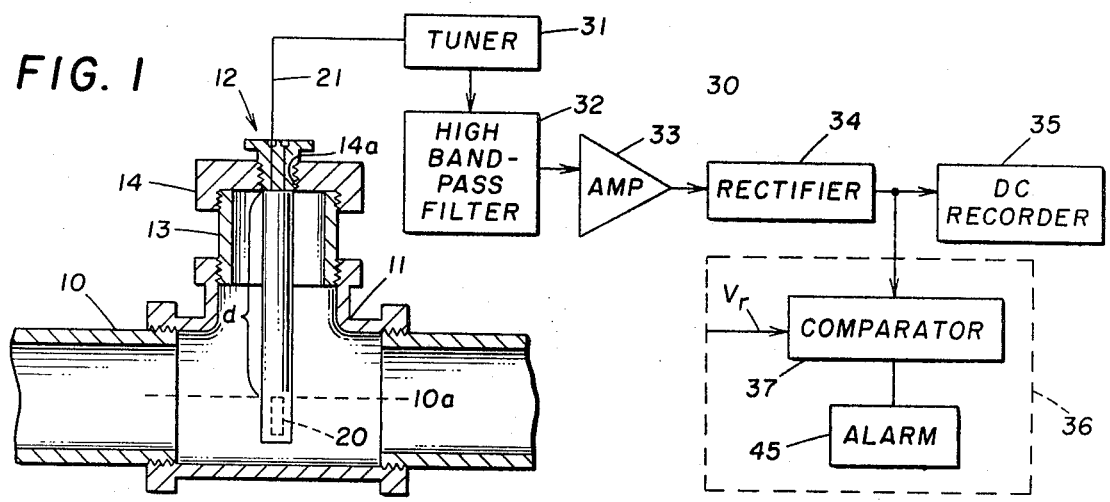
FIG. 1 is an elevated view, partly in section, of the probe means of the present invention in place in a conduit along with a block diagram of the circuitry which can be used to process the signal from the probe means.

Referring more particularly to the drawings, FIG. 1 discloses a conduit 10 which is adapted to carry a fluid flow stream which is to be monitored continuously in accordance with the present invention. Conduit 10 is preferably one which connects the wellhead of a producing oil and/or gas well with surface production equipment, eg., a separator. Access into conduit 10 is provided by means of tee 11 which forms part of conduit 10, extension pipe 13, and cap 14 which has threaded opening 14a therethrough, all clearly shown in FIG. 1. Particulate material detection probe means 12 is positioned directly into conduit 10 through opening 14a and is affixed to cap 14 by means of mating threads or the like.

Particulate material detection probe means 12 (FIG. 2) is comprised of an elongated, cylindrical housing 15 which is closed at one end 16. It is important to make this housing as thin-walled as possible while still maintaining adequate structural integrity so that the response of housing 15 to impinging material will be as great as possible. Further, it is preferred to coat the external surface of housing 15 with a thin layer of wear-resistant material, e.g., titanium carbide, (not shown) to extend the operational life of probe means 12. Plug means 17, having two passages 18, 19 therethrough, is affixed to the other end of housing 15 to seal same. Plug 17 is externally threaded for securing probe means 12 in opening 14a of cap 14. It is noted that probe means 12 is attached to conduit 10 only at one end so that housing 15 is free to resonate when struck by the flow stream.

Figure 2:
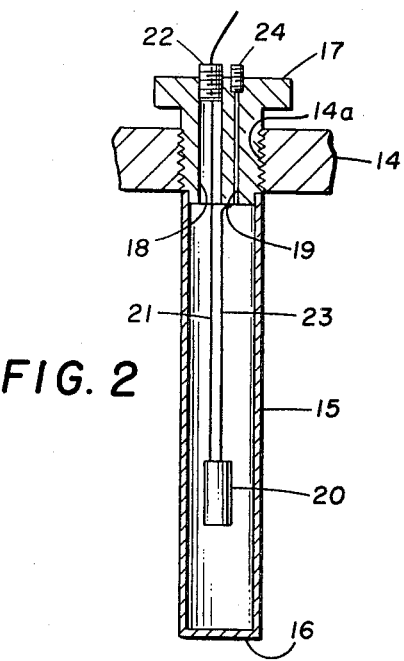
FIG. 2 is an enlarged, sectional view of the probe means of FIG. 1.

Transducer 20 is suspended in housing 15 by means of its signal output lead 21 which passes through electrical connector 22 in opening 18 and by its ground lead 23 which is attached to plug 17 as shown in FIG. 2. Opening 19 through plug 17, which is normally sealed by threaded plug 24, provides a passage for filling housing 15 with a noncompressible, nonconductive fluid (not shown), e.g, oil. Transducer 20 is positioned within housing 15 in such a way that it hangs suspended therein and does not touch the housing wall or bottom and is acoustically coupled to housing 15 only by means of the oil in the housing.

Figure 3:
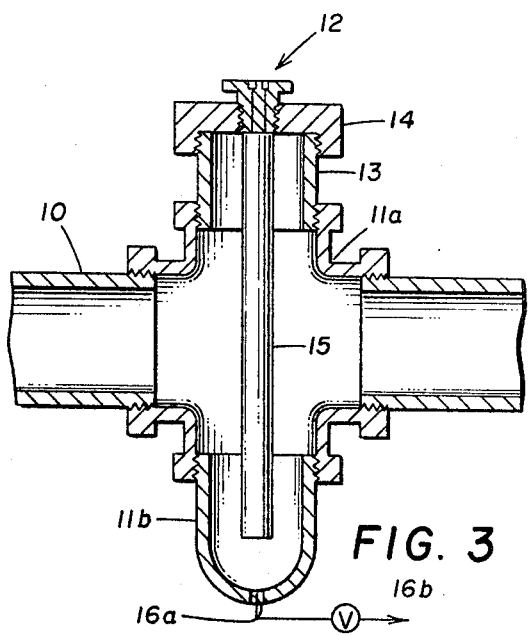
FIG. 3 is an elevated view, partly in section, of modified structure for mounting the probe means of FIG. 1 in a conduit.

When probe means 12 is in place and flow is taking place through conduit 10, the flow stream will strike directly onto the wall of housing 15. When conduit 10 is horizontal, it is preferred that transducer 20 extends into housing 15 for that distance $d$ (FIG. 1) which is necessary to insure that transducer 20 will be positioned in the lower portion of conduit 10 (below line 10a) when probe means 12 is in an operable position within conduit 10. This is done so that transducer 20 will be effectively positioned in the path of the main concentration of sand in the flow stream which normally occurs in the lower portion of conduit 10 due to natural gravitational forces. To insure that such positioning is possible in smaller diameter conduits, alternate structure for mounting probe 12 in conduit 10 is shown in FIG. 3. Cross 11a replaces tee 11 of FIG. 1 and a bull plug 11b or the like is used to provide greater vertical area in conduit 10 for mounting probe means 12. Valve 16b is connected to opening 16a in bull plug 11b to periodically bleed off any sand that might accumulate in plug 11b. Also by extending probe means 12 into bull plug 11b, if housing 15 should break, it becomes jammed between extension pipe 13 and bull plug 11b and is not carried off by the flow stream to cause possible damage to valves, separators, or other downstream equipment.

Transducer 20 is preferably a piezoelectric crystal which is tuned to the primary resonant frequency of one of its modes so that it provides a peak output at said tuned frequency while attenuating most other frequencies. For the detection of particulate material, this primary resonant frequency has to be above the 100 kilohertz range as will be more fully discussed below. By tuning transducer 20 to a primary resonant frequency, the transducer responds to the frequencies generated by the kinetic energy given up by the particulate material impinging on oil-filled housing 15, and, in turn, produces a signal indicative thereof. The output of transducer 20 is fed through lead 21 into processing circuitry 30 (FIG. 1) to convert the signal to some usable format as will be described below.

A more complete understanding of the present invention may be had by referring to the following specific example. Housing 15 of probe means 12 comprises a ¾-inch diameter, stainless steel tube having a wall thickness of 0.049 inch. The external wall of the tube is coated with a 0.0005-inch layer of titanium carbide by means of a commercially available process. A piezoelectric, ceramic crystal in the shape of a circular disc (e.g., Vernitron PTZ-5), having a 0.5-inch diameter and a 0.1-inch thickness forms transducer 20 and is assembled into probe means 12 as described above. Housing 15 is filled with oil through opening 19 to acoustically couple the transducer to the housing without allowing physical contact between the two.

The particular piezoelectric crystal 20 is selected because its primary resonant frequency in one of its modes, i.e., the thickness mode, is approximately 700 kilohertz which is well above the minimum 100 kilohertz frequency range required for positive detection of particulate material in the flow stream.

Figure 4:
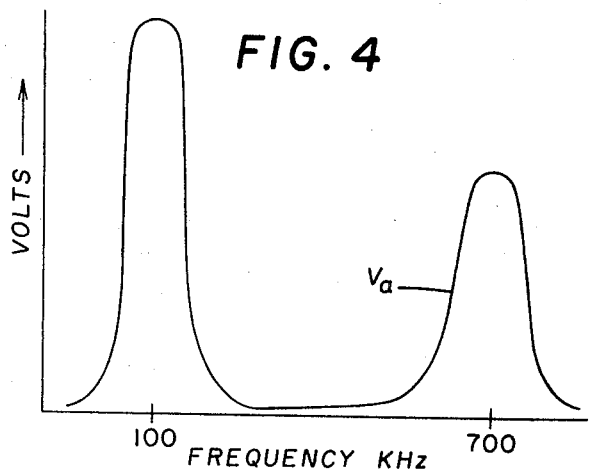
FIG. 4 is a graphic representation of the tuned responsive curve of the transducer of the probe means in FIG. 2.
Figure 6:
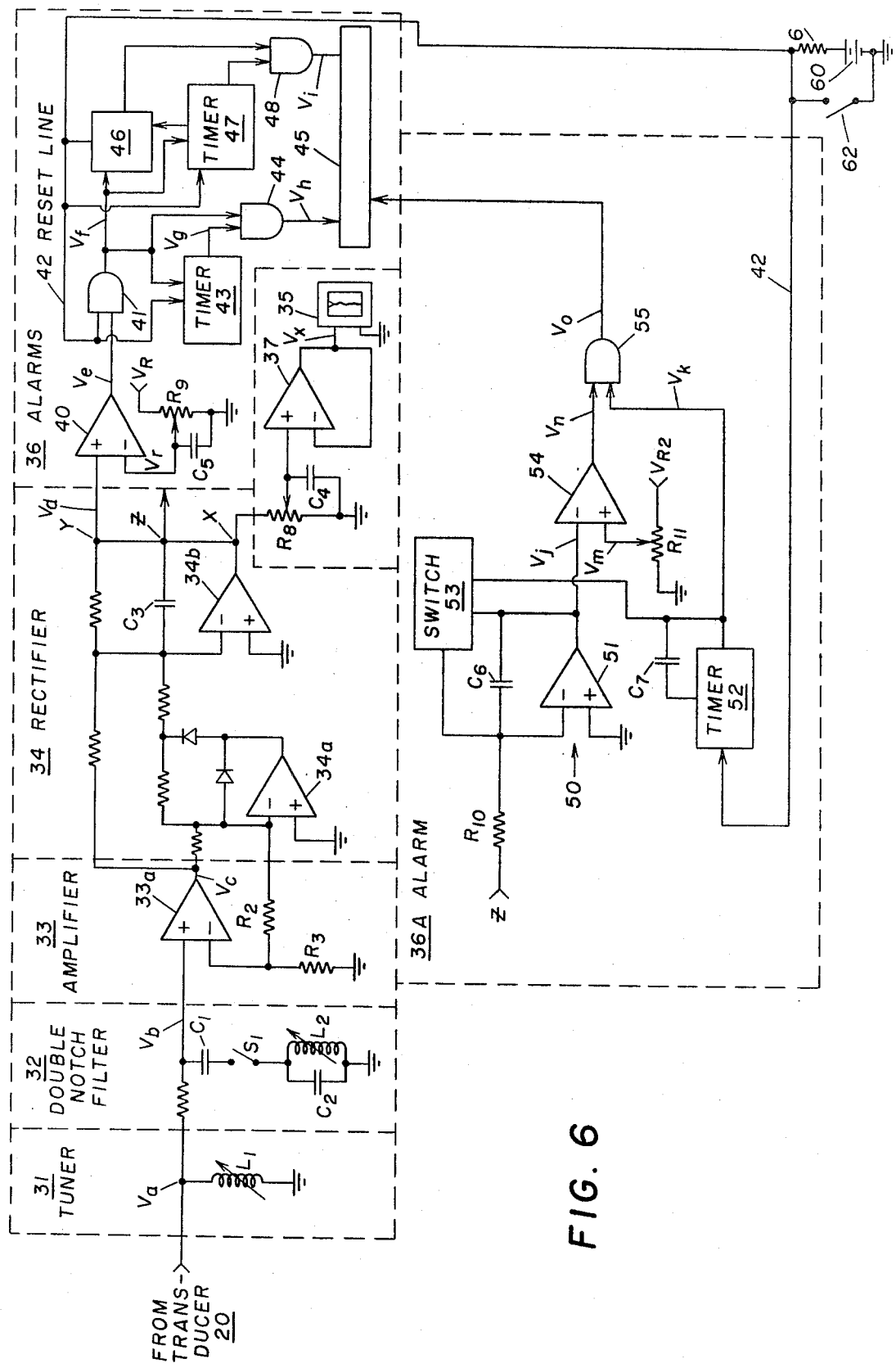
FIG. 6 is a detailed schematic diagram of the circuitry 30 shown in FIG. 1.

Referring now to the schematic of circuitry 30 disclosed in FIG. 6, the peak output of crystal 20 is tuned by means of tuner 31 (comprising coil $L_1$) to its primary resonant frequency in its thickness mode, e.g., approximately 700 kilohertz. The typical tuned voltage response $v_a$ at top of coil $L_1$ for crystal 20 is illustrated by the curve in FIG. 4.

It will be noted that the response curve of the particular crystal selected shows two resonant frequencies, one at approximately 100 kilohertz which occurs in the radial mode of the crystal and another at approximately 700 kilohertz which occurs in the thickness mode of the crystal. The output signal generated by the crystal upon particulate material striking housing 15 contains frequency components in both the 100 kilohertz range and the 700 kilohertz range. However, since the output signal of the crystal in response to normal flow, pump noise, and/or other extraneous noises striking housing 15 may also contain frequency components in the 100 kilohertz range, reliance upon the 700 kilohertz range is necessary to insure that particulate material is, in fact, present in the flow stream. Output signals from the crystal in response to normal flow, pump noise, etc., will not contain frequency components in the 700 kilohertz range.

Figure 5:
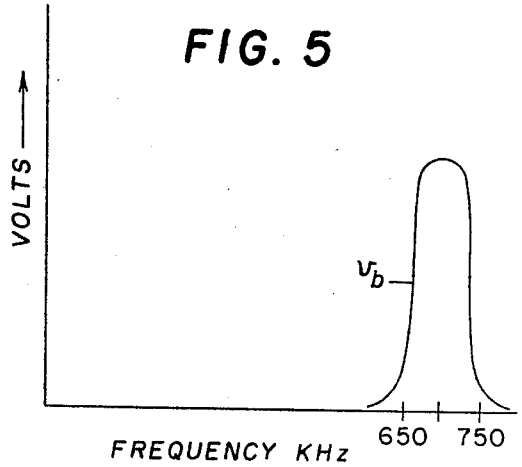
FIG. 5 is a graphic representation of the output signal of the transducer after it has passed through the filter of FIG. 1.

The tuned output voltage $v_a$ from crystal 20 is modified by filter 32 such that only signal components of interest are applied to amplifier 33. Filter 32 is illustrated as a double-notch type comprised of a series filter $C_1L_2$, and a parallel filter $C_2L_2$. The series filter is tuned to present a low impedance to signal components centered about 100 kilohertz, thus effectively shunting such components to ground. The parallel filter presents a high impedance to signal components centered about a frequency of 700 kilohertz, thus developing the voltage $v_b$. With switch $S_1$ closed, filter 32 provides an attenuation of the response at 100 kilohertz (see FIG. 5) but passes a band of frequencies of approximately 100 kilohertz wide centered about 700 kilohertz, i.e., 650 to 750 kilohertz, giving a typical response voltage $v_b$ such as illustrated in FIG. 5. The opening of switch $S_1$ disables the filter 32 to enable an operator to test the system. If the system is operative, a signal resulting from fluid flow around the transducer 20 will be registered with or without the presence of sand.

As illustrated, output $v_b$ is next amplified by amplifier 33 whose gain is controlled or fixed by one or more stages utilizing any of several commercially available operational amplifiers 33a, e.g., National Semiconductor LM118 or Fairchild μA715, as is well known in the art. The output voltage $v_c$ of amplifier 33 has a characteristic similar to the curve $v_b$ of FIG. 5, except its magnitude is multiplied by the gain of amplifier 33 which in the present case was about one hundred.

Output $v_c$ of amplifier 33 is applied to rectifier 34 comprised of operational amplifiers 34a and 34b. Capacitor $C_3$ smoothes the rectified AC signal so that output voltage signal $v_d$ from rectifier 34 is an averaged varying DC voltage whose magnitude is the averaged rectified version of output voltage $v_c$, free of spikes, i.e., rapidly varying signal changes. Rectifier 34, as illustrated, is of the type commonly referred to as a linear rectifier. Output voltage $v_d$ of rectifier 34 appears simultaneously at three output terminals X, Y, and Z.

Output voltage $v_d$ from terminal X is applied through a standard voltage follower 37, e.g., operational amplifier, to a typical DC strip chart recorder 35. The input to follower 37 is a fractional part of voltage $v_d$ (determined by potentiometer $R_8$) which makes the range of output voltage $v_d$ compatible with the range of recorder 35. Recorder 35 makes a permanent record on the strip chart of the processed signal from crystal 20 which is representative of particulate material content in the fluid flow stream. As will be more fully explained below, the recorded information can be translated into actual particulate material concentration by use of an empirically derived relationship.

When producing fluid minerals from incompetent formations, large segments of the formation may break off intermittently which in turn accounts for high sand production for only a relatively short period of time, after which little or no sand production occurs until the next segment breaks loose. In view of this phenomenon, the average sand production over a set period of time and/or the number of times that high sand production occurs in a set time interval are sometimes more meaningful in oil and/or gas production than the particular sand concentration in the flow stream at any one instance. Alarm circuit 36 (FIG. 6) provides a means for warning an operator of both such conditions.

Alarm circuit 36 is comprised of comparator 40, e.g., operational amplifier, having one input connected to terminal Y and another input adapted to receive reference voltage $v_r$ which in turn is determined by resistor $R_9$ and regulated DC voltage $V_R$. Reference voltage $v_r$ in the present situation is a signal representative of the maximum sand content which can be tolerated in the flow stream under particular production conditions. Output voltage $v_e$ from comparator 40 is applied to one input of AND gate 41. Reset line 42, which provides a means for resetting the alarm, is connected to another input of AND gate 41. If voltage $v_d$ is less than reference voltage $v_r$, output voltage $v_e$ is a logical "false" level. If voltage $v_d$ exceeds reference voltage $v_r$, voltage $v_e$ is a logical "true" level. The output voltage $v_f$ of AND gate 41 will be a logical true level if, and only if, both voltage $v_e$ and reset line 42 are simultaneously at logical true levels.

In a first part of alarm circuit 36, output $v_f$ is applied both to timer 43 and to one input of AND gate 44. Timer 43 is preferably a resettable electronic timer of the integrated circuit type, e.g., Signetic NE555, whose inputs are logical levels (i.e., inputs are a reset and a trigger to start the timed interval) and whose output is a logical level determined by an adjustable timed interval. At the beginning of operation, output voltage $v_g$ of timer 43 is a logical false level when in reset state and remains in this state even after the first true excursion of $v_f$ starts the time interval. Output voltage $v_g$ becomes a true level only after the predetermined time interval lapses. The reset is activated for timer 43 when either the reset line 42 or voltage $v_g$ makes a false excursion. Hence, output voltage $v_g$ of timer 43 becomes a logical true level only if $v_e$ rises to a true level and remains there for the entire timed interval. Accordingly, output voltage $v_h$ of AND gate 44 remains false unless voltage $v_d$ exceeds reference voltage $v_r$ for the interval of timer 43, e.g., 3 minutes. Output voltage $v_h$ is applied to alarm storage member 45, e.g., commercial available "Flip-Flop", which in turn issues a visual or audio alarm, closes in production valves, or performs some other desired function. This part of alarm circuit 36 warns an operator when unacceptably high sand production continues over a set period of time.

As thus far described, an alarm will sound when excessive sand production persists continuously for the period of timer 43. Operators are also interested if sand is being produced intermittently in high quantities. Such function is provided in a second part of alarm circuit 36 wherein output voltage $v_f$ from AND gate 41 is applied simultaneously to both electronic counter 46 and timer 47. Counter 46, whose output is applied to one input of AND gate 48, counts the number of true excursions of voltage $v_f$ and applies a logical true to AND gate 48 when a predetermined count is obtained. Timer 47 is of the same basic type as timer 43 but is adapted to supply a logical true level to another input of AND gate 48 continuously throughout a time interval which may or may not be the same as that of timer 43. Output voltage $v_i$ from AND gate 48 will be a logical true level when and only when a predetermined number of true excursions of voltage $v_f$ have been counted by counter 46 and the time interval of timer 47 has not expired. Timer 47 is resettable by either the time interval expiring or by reset line 42. The reset of timer 47 causes the counter 46 to reset.

Output voltage $v_i$ is applied to alarm storage means 45 for the same purposes as before. It warns an operator that the instances of excess sand content during a predetermined time interval exceeded an acceptable number.

Still another alarm 36A (FIG. 4) provides an alarm indicative of "wear" caused by total sand production over a given period. Output voltage $v_d$ from terminal Z is applied to integrator 50, comprised of resistor $R_{10}$, capacitor $C_6$, and operational amplifier 51, whose output $v_j$ is proportional to the time integral of $v_d$.

Integrator 50 is reset to zero at the end of a timed interval determined by timer 52 by means of electronic switch 53, and timer 52 is itself reset through application of the reset signal by way of capacitor $C_7$. During the timing interval, timer 52 supplies voltage signal $v_k$, a true level, to one input of AND gate 55. Output voltage $v_j$ of integrator 50 is applied to comparator 54 where it is compared to reference voltage signal $v_m$ which is determined by resistor $R_{11}$ and regulated DC voltage $V_{R2}$. Output voltage $v_n$ of comparator 54 is applied to another input of AND gate 55. Output voltage $v_n$ of AND gate 55 will be a true logical level if, and only if, the integration of voltage $v_d$ (i.e., $v_j$ which is the cumulative amount of sand) exceeds the reference signal $v_m$ (i.e., the total amount of sand which can be tolerated) before the time interval of timer 52 has expired. Output voltage $v_o$ is applied to alarm storage means 45 which warns an operator that the average rate of equipment wear due to produced sand has exceeded an acceptable rate and that corrective measures are required.

During operation of the system, a true logic signal is applied to the reset line 42 from battery 60 by way of resistor 61. When it is desired to reset the system, including the various alarms, switch 62 is closed to apply a ground, false logic signal, to the reset line 42.

As mentioned above, the signal from crystal 20 as recorded by recorder 35 can be translated into the actual concentration of sand passing the transducer in the flow stream. The relationship of the signal from crystal 20 to sand content in a fluid flow stream has been shown empirically to vary in accordance with the kinetic energy generated by the sand striking housing 15 of probe means 12. For a more complete discussion of this relationship, see "Sand Production Determined from Noise Measurement" by N. Stein, W. F. Baldwin, and W. E. McNeely, appearing in THE JOURNAL OF PETROLEUM TECHNOLOGY, July 1972, at pages 803–806, and U.S. Pat. No. 3,563,311 to N. Stein, issued Feb. 16, 1971. In the present invention, experiments have been conducted wherein the signals from probe means 12 were recorded from liquid flow streams flowing at three separate flow rates with two sand concentrations at each rate from which the following relationship between sand concentration and signal was derived:

$$R = V/400 \ S^3 \tag{1}$$

wherein:
 $R$ = concentration of sand in pounds of sand per 1,000 barrels API,
 $V$ = signal level at the probe, peak to peak in nanovolts,
 400 = conversion constant, and
 $S$ = velocity of liquid flow stream in feet per second.

The voltage $V_R$ recorded by recorder 35 is directly proportional to the signal level V at the probe. The relationship is established by the parameters of the various circuit components such as amplifier gain and setting of potentiometer $R_8$. Having knowledge of such parameters, they can be expressed as a constant K for any given adjustment of the system. Therefore:
$V = KV_R$ and Equation 1 then may be rewritten as $$R = KV_R/400 \ S^3 \quad (2)$$

With S being known for a particular flow rate through a particular conduit, a computer can be programmed to receive the processed signal V from probe means 12 and to provide a direct readout of sand concentration. Likewise, the same may be accomplished utilizing $V_R$ as in Equation 2. Further, Equations 1 and 2 can each be expressed as a family of curves representing different concentrations of sand on a plot of signal versus flow velocity from which sand concentration represented by a particular signal at a particular flow rate can be determined directly.

What is claimed is:

1. A system for monitoring a flow stream through a conduit to detect the presence of a particulate material in said flow stream, said system comprising:
   acoustical transducer means responsive to particulate material impinging thereon to generate an output signal representative of said impinging particulate material, said transducer means including a peizoelectric means having a primary resonant frequency in excess of 100 kilohertz;
   means for positioning said acoustical transducer means directly into the flow stream in said conduit;
   output means connected to said acoustical transducer means for conducting said output signal from said transducer means to a point outside said conduit;
   circuitry means connected to said output means for processing said output signal, said circuitry means including means for measuring said primary resonant frequency component of said output signal; and
   means for applying said processed signal to a utilization device.

2. The system of claim 1 wherein said utilization device comprises:
   a means for recording said signal.

3. The system of claim 1 wherein said utilization device comprises:
   alarm circuitry means for determining when the particulate material content of said flow stream exceeds a predetermined condition.

4. The system of claim 1 wherein said means for measuring includes:
   filter means for filtering said output signal to pass only a filtered signal corresponding to a narrow band of frequencies centered about said primary resonant frequency of said piezoelectric means; and
   means for amplifying said filtered signal.

5. The system of claim 4 wherein:
   said primary resonant frequency is approximately 700 kilohertz.

6. The system of claim 5 including:
   means for tuning said piezoelectric means to respond rapidly to frequencies of approximately 700 kilohertz; and
   wherein said filter means passes a narrow band of frequencies centered about 700 kilohertz.

7. The system of claim 6 wherein said circuitry means further includes:
   rectifier means for processing said filtered and amplified signal to provide a signal whose magnitude is the averaged rectified version of said filtered and amplified signal.

8. The system of claim 7 wherein said means for utilizing said processed signal comprises:
   a recorder means for recording said rectified signal.

9. The system of claim 7 wherein said utilization device comprises:
   alarm circuitry means for determining when the particulate material content of said flow stream exceeds a predetermined condition.

10. The system of claim 9 wherein said alarm circuitry means comprises:
    a comparator means having a first input and a second input to generate an error signal when a signal applied to said first input exceeds a signal applied to said second input;
    means for connecting said first input to said processing circuitry means for applying said processed signal to said comparator means;
    means connected to said second input for applying a reference signal representative of said predetermined particulate material content in said flow stream to said comparator;
    an alarm; and
    means for applying said error signal to said alarm.

11. A system for monitoring a flow stream through a conduit to detect the presence of a particulate material in said flow stream, said system comprising;
    acoustical transducer means responsive to particulate material impinging thereon to generate an output signal representative of said impinging particulate material, said acoustical transducer means comprising:
    a probe means having a housing;
    a transducer suspended within said housing, said transducer having a primary resonant frequency in excess of 100 kilohertz;
    a noncompressible, nonconductive fluid filling said housing whereby said transducer is effectively coupled to said housing;
    means on said probe means adapted for positioning said housing directly into the flow stream through said conduit so that when said probe is in place within said conduit the flow stream will impinge directly onto said housing;
    means attached to said transducer and extending from said housing for providing an output of said signal from said transducer;
    circuitry means connected to said output means for processing said output signal, said circuitry means including means for measuring said primary resonant frequency component of said output signal; and
    means for applying said processed signal to a utilization device.

12. The system of claim 11 wherein:

said housing is an elongated, cylindrical tube which is adapted to be positioned within said conduit with its elongated axis perpendicular to said flow stream.

13. The system of claim 12 wherein:
said conduit is horizontal and wherein said transducer is positioned at a distance within said cylindrical tube necessary to insure that said transducer means will lie in the lower portion of said conduit when said probe means is in an operable position within said conduit.

14. The system of claim 11 wherein:
said primary resonant frequency is approximately 700 kilohertz.

15. The system of claim 14 wherein said circuitry means for processing said output signal comprises:
means for tuning said transducer to respond rapidly to frequencies of approximately 700 kilohertz;
filter means for filtering said tuned output signal of said transducer to pass a filtered signal corresponding to a narrow band of frequencies centered about 700 kilohertz;
means for amplifying said filtered signal; and
means for rectifying said filtered and amplified signal to provide a signal whose magnitude is the average rectified version of said filtered and amplified signal.

16. A system for monitoring a flow stream to detect the presence of a particulate material in a flow stream, said system comprising:
particulate detection means comprising:
a housing;
transducer means suspended within said housing, said transducer means having a primary resonant frequency in excess of 100 kilohertz;
means in said housing for allowing said housing to be filled with a noncompressible liquid;
means for positioning said housing in relation to said flow stream so that said transducer means is responsive to energy generated by particulate material in said flow stream;
output means for providing an output for said signal generated by said transducer means;
circuitry means connected to said output means for processing said output signal, said circuitry means including means for measuring said primary resonant frequency component of said output signal; and
means for applying said processed signal to a utilization device.

17. The system of claim 16 wherein said utilization device comprises:
a means for recording said signal.

18. The system of claim 16 wherein said utilization device comprises:
alarm circuitry means for determining when the particulate material content of said flow stream exceeds a predetermined condition.

19. The system of claim 16 wherein said means for measuring includes:
filter means for filtering said output signal to pass only a filtered signal corresponding to a narrow band of frequencies centered about said primary resonant frequency; and
means for amplifying said filtered signal.

20. The system of claim 19 including:
means for tuning said transducer means to respond rapidly to frequencies of approximately 700 kilohertz; and
wherein said filter means passes a narrow band of frequencies centered about 700 kilohertz.

21. The system of claim 20 wherein said circuitry means further includes:
rectifier means for processing said filtered and amplified signal to provide a signal whose magnitude is the averaged rectified version of said filtered and amplified signal.

22. The system of claim 21 wherein said means for utilizing said processed signal comprises:
a recorder means for recording said rectified signal.

23. The system of claim 21 wherein said utilization device comprises:
alarm circuitry means for determining when the particulate material content of said flow stream exceeds a predetermined condition.

24. The method of monitoring the presence of small, particulate material in a fluid flow stream, said method comprising:
positioning an acoustical transducer means in the path of said flow stream whereby said transducer means is responsive to particulate material impinging on said transducer means;
generating a signal from said acoustical transducer means when said particulate material impinges thereon which is representative of the kinetic energy imparted to said transducer means by said impinging particulate material;
processing said signal to retrieve only the frequency components of said signal in a narrow band centered about 700 kilohertz; and
utilizing said retrieved frequency components to monitor the presence of said particulate material.

* * * * *